United States Patent [19]

Davis

[11] Patent Number: 5,660,782
[45] Date of Patent: Aug. 26, 1997

[54] METHOD AND APPARATUS FOR INJECTION MOLDING OF SELECTED PARTS

[75] Inventor: Thomas Francis Davis, Camp Hill, Pa.

[73] Assignee: The Whitaker Corporation, Wilmington, Del.

[21] Appl. No.: 455,481

[22] Filed: May 31, 1995

[51] Int. Cl.$^6$ .................................................. B29C 45/10
[52] U.S. Cl. .......................... 264/297.2; 264/328.8; 264/328.11; 425/183; 425/190; 425/575; 425/588
[58] Field of Search .................. 425/183, 190, 425/192 R, 575, 588; 264/328.1, 328.8, 328.7, 328.11, 297.2, 272.11, 272.14

[56] References Cited

U.S. PATENT DOCUMENTS

| | | | |
|---|---|---|---|
| 3,756,553 | 9/1973 | Ranz | 249/142 |
| 3,807,928 | 4/1974 | Horberg, Jr. et al. | 425/387 B |
| 4,303,221 | 12/1981 | Galluser et al. | 249/102 |
| 4,330,248 | 5/1982 | Platte | 425/183 |
| 4,379,685 | 4/1983 | Tada et al. | 425/183 |
| 4,501,548 | 2/1985 | Jahnel | 425/183 |
| 4,550,006 | 10/1985 | Laghi | 425/183 |
| 4,815,960 | 3/1989 | Rudolph | 425/522 |
| 4,861,534 | 8/1989 | Boehm et al. | 264/102 |
| 5,255,889 | 10/1993 | Collette et al. | 249/102 |
| 5,282,733 | 2/1994 | Noritake et al. | 425/183 |

FOREIGN PATENT DOCUMENTS

| | | |
|---|---|---|
| 63 062 332 | 3/1988 | Japan . |
| 60 15 685 | 1/1994 | Japan . |
| 2 233 596 | 1/1991 | United Kingdom . |

*Primary Examiner*—Jill L. Heitbrink

[57] ABSTRACT

A method and apparatus for injection molding several different parts in a reconfigurable mold is disclosed. The mold machine (10) includes a first mold body (14) attached to a machine frame (12) and second and third mold bodies (16, 18) that are movable with respect to the first mold body (14). A mold frame controller (100) is interconnected to and controls three linear actuators (56, 66, 88) that are arranged to move the three mold bodies into different configurations. Each mold body has mold cavities (24, 44, 46, 80) that can be aligned with mold cavities in the other mold bodies to form different combinations for forming a variety of different parts.

20 Claims, 5 Drawing Sheets

METHOD AND APPARATUS FOR INJECTION MOLDING OF SELECTED PARTS

The present invention relates to injection molding apparatus for molding parts and more particularly to such apparatus that is reconfigurable to mold one of several different parts, in particular, electrical connector housings.

BACKGROUND OF THE INVENTION

Molds for making injected molded parts are typically utilized in relatively high production environments where thousands of parts are molded in quick succession. These molds frequently are in continuous operation for days or weeks making the same part. When it is desirable to make a different part the mold is removed from the mold machine and replaced with a different mold. This, of course, means that the mold machine must be taken out of production while the molds are being changed. This usually does not cause an economic hardship because of the very large numbers of parts that are produced during the relatively long production cycle. The relatively short down time to change the molds is tolerable. However, when shorter production cycles are required because a smaller number of different parts is needed, the production down time needed for changing molds becomes more significant resulting in a greatly increased economic liability.

Reconfigurable molds are known that can be manipulated to mold different parts. These molds usually require that the mold be disassembled and mold sections either be added or subtracted. This, of course, requires that the mold machine be taken out of production while the mold is reconfigured. An example of this type of reconfigurable mold is disclosed in U.S. Pat. No. 5,255,889 which issued Oct. 26, 1993 to Collette et al. The '889 patent discloses a blow mold for making a beverage bottle, having upper and lower mold sections that are joined by various intermediate sections that can be added or removed from the middle to mold the desired size bottle. While some of the same mold parts are common to all parts that are molded, the reconfiguring process consumes a significant amount of time resulting in slowed production. As with most mold machines, after shutdown of the machine to reconfigure the mold, the machine must be purged of old mold material. When the machine is again brought on line, the first several molded parts must be discarded until the process restabilizes. Another example of a reconfigurable mold is disclose in U.S. Pat. No. 4,861,534 which issued Aug. 29, 1989 to Boehm et al. This mold is for molding circuit boards and utilizes a single mold cavity with an array of core pins that are selectively retractable from the cavity. By allowing only the core pins that are required to produce the desired hole pattern in the circuit board to remain in the mold cavity and retracting all others, any desired hole pattern may be produced in the circuit board. However, when a circuit board of different size is required, the mold must be changed.

What is needed is a reconfigurable mold that can be easily and automatically changed to make relatively small quantities of different parts without taking the mold machine out of production for long periods of time while the mold is changed.

SUMMARY OF THE INVENTION

An apparatus and a method are provided for selectively molding one of a plurality of different parts. The apparatus includes first, second, and third mold bodies that interact in combination to provide different mold cavities for molding the different parts. The first mold body has a first surface and a first mold cavity therein intersecting the first surface. The second mold body has a second surface arranged for engagement with the first surface and includes second and third mold cavities therein intersecting the second surface. One of the first and second mold bodies is selectably movable with respect to the other so that one of the second and third mold cavities is in communication with the first mold cavity. An actuator is provided for effecting the movement of the one mold body and an injection means is associated with the molding apparatus for injecting molding material into the first mold cavity.

DESCRIPTION OF THE PREFERRED EMBODIMENT

Figure 1:
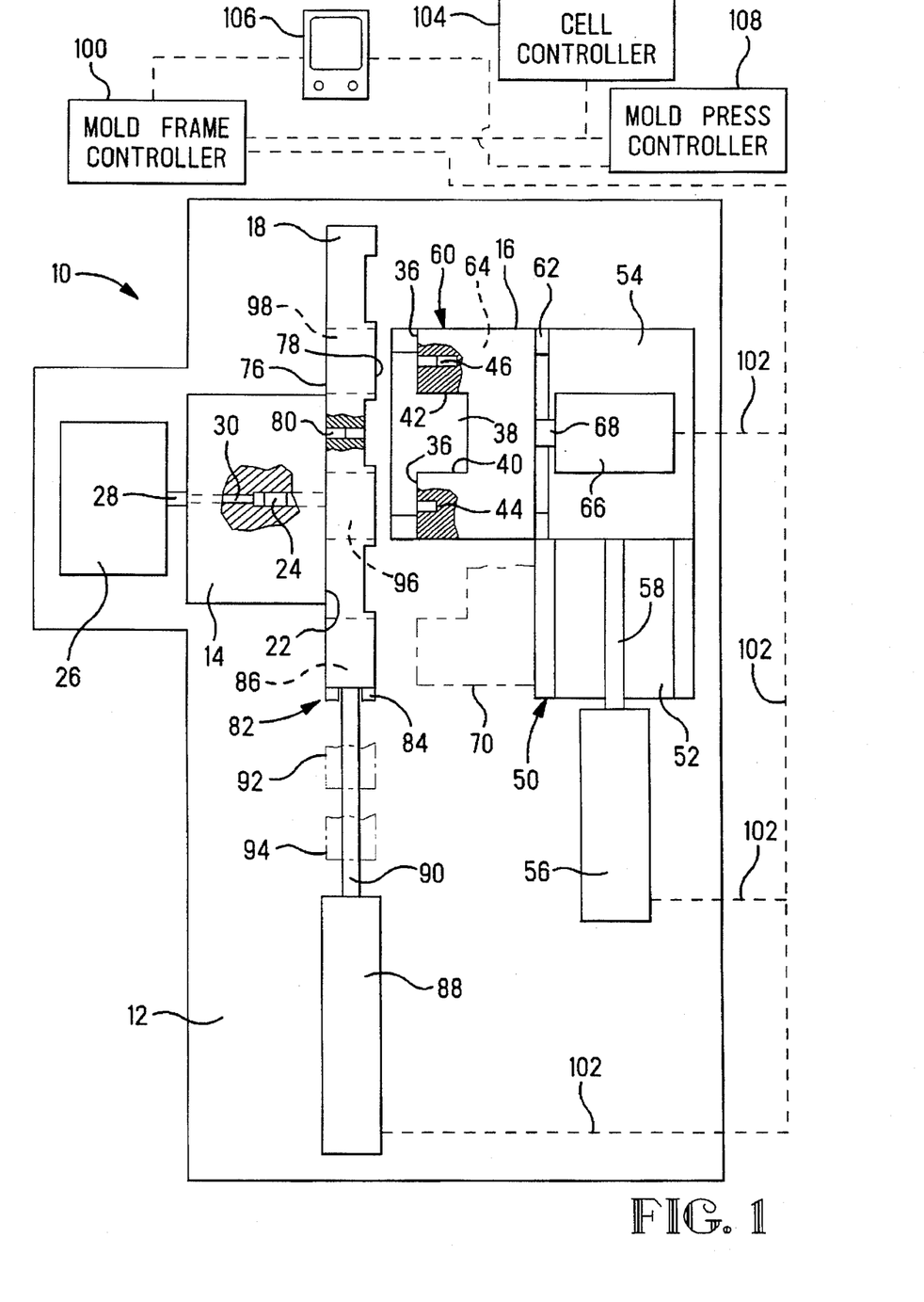
FIG. 1 is a schematic representation of the major functional components of a reconfigurable mold machine which illustrates the teachings of the present invention.

The major functional elements of an injection mold machine 10, in accordance with the teachings of the present invention, are schematically depicted in FIG. 1. While the present mold machine 10 is arranged to selectively mold several different electrical connector housings, the machine may be easily adapted to make any suitable desired molded part. As shown in FIG. 1, the machine 10 includes a frame 12 and first, second, and third mold bodies 14, 16, and 18, respectively. The first mold body 14 is rigidly attached to the frame 12 by any suitable means while the second and third mold bodies 16 and 18 are slidingly coupled to the frame as will be explained. The first mold body 14 includes a first surface 22 and a first mold cavity 24 that intersects the surface 22. An injector 26 is attached to the frame 12 and injects mold material into the first cavity via a passageway 28 which is in communication with the first mold cavity through a hole 30 formed in the first mold body. Alternatively, the passage 28 may communicate directly with the first mold cavity 24 without the need for the hole 30.

The second mold body 16 includes a second surface 36 that is parallel to the first surface and opposed thereto, as shown in FIG. 1. A cutout 38 is formed in the second surface 36 thereby forming two legs 40 and 42. The leg 40 includes a second mold cavity 44 and the leg 42 includes a third mold cavity 46, each of which intersects the second surface 36. The second mold body is slidingly coupled to the frame 12 by means of two slides arranged at right angles to each other. A vertically disposed slide 50, as viewed in FIG. 1, has its stationary portion 52 attached to the frame 12 by any suitable means, while its movable portion 54 is arranged opposite the first surface 22 so that it slides in a direction parallel to the first surface. A first linear actuator 56, which in the present example is an air cylinder, is attached to the frame 12 and includes a piston rod 58 that is coupled to the movable portion 54. A horizontally disposed slide 60, as viewed in FIG. 1, has its stationary portion 62 attached to the movable portion 54, of the slide 50, and has its movable portion 64 arranged to move in a direction toward and away from the first surface 22 while remaining perpendicular thereto. The second mold body 16 is attached to the movable portion 64 of the slide 60. A second linear actuator 66, which is an air cylinder in the present example, is attached to the movable portion 54. The second actuator 66 includes a piston rod 68 that is coupled to the movable portion 64 of the slide 60 for moving the second mold body 16 between a retracted position, shown in solid lines in FIG. 1, and an extended position where the second surface 36 is in engagement with the first surface 22, not shown in FIG. 1. The first actuator 56 is arranged to move the second mold body 16 between an extended position shown in solid lines, in FIG. 1, and a retracted position shown in phantom lines at 70.

The third mold body 18 includes third and fourth parallel surfaces 76 and 78, respectively. A third mold cavity 80 extends through the third mold body intersecting the two surfaces 76 and 78. A vertically disposed slide 82, as viewed in FIG. 1, includes a stationary portion 84 that is attached to the frame 12 and a movable portion that is attached to and carries the third mold body 18. The slide 82 is positioned so that the third surface 76 is adjacent and in sliding engagement with the first surface 22. A third linear actuator 88, an air cylinder in the present example, includes a piston rod 90 that is coupled to the stationary portion 84 of the slide 82 for moving the third mold body 18 in a direction parallel to the first surface 22. The third actuator 88 moves the third mold body between an extended position shown in solid lines in FIG. 1, an intermediate position shown in phantom lines at 92, and a retracted position shown in phantom lines at 94. The third mold body 18 includes two opening 96 and 98 that extend completely through the body 18 intersecting the third surface 76, for a purpose that will be explained. It will be understood that all three of the mold bodies 14, 16, and 18 are suitably split so that the molded parts can be removed, in a manner that is well known in the art.

Control of the three linear actuators 56, 66, and 88 is effected by means of a mold frame controller 100 in the usual manner. The controller 100 is interconnected to the actuators via control lines 102, pressurized air lines in the present example, and can selectively operate the three actuators 56, 66, and 88. A cell controller 104 is interconnected to the mold frame controller 100 for automatically commanding the machine 10 to reconfigure the three mold bodies to produce the desired part. The cell controller 104 is an existing piece of equipment that controls operation of several machines within a manufacturing facility. An input/output terminal 106 is optionally interconnected with the mold frame controller 100 so that an operator can manually enter mold configuration commands. A mold press controller 108 is provided for controlling various standard press functions such as opening and closing the mold, commanding the mold material injection system, and ejection of the finished molded parts.

Figure 9:
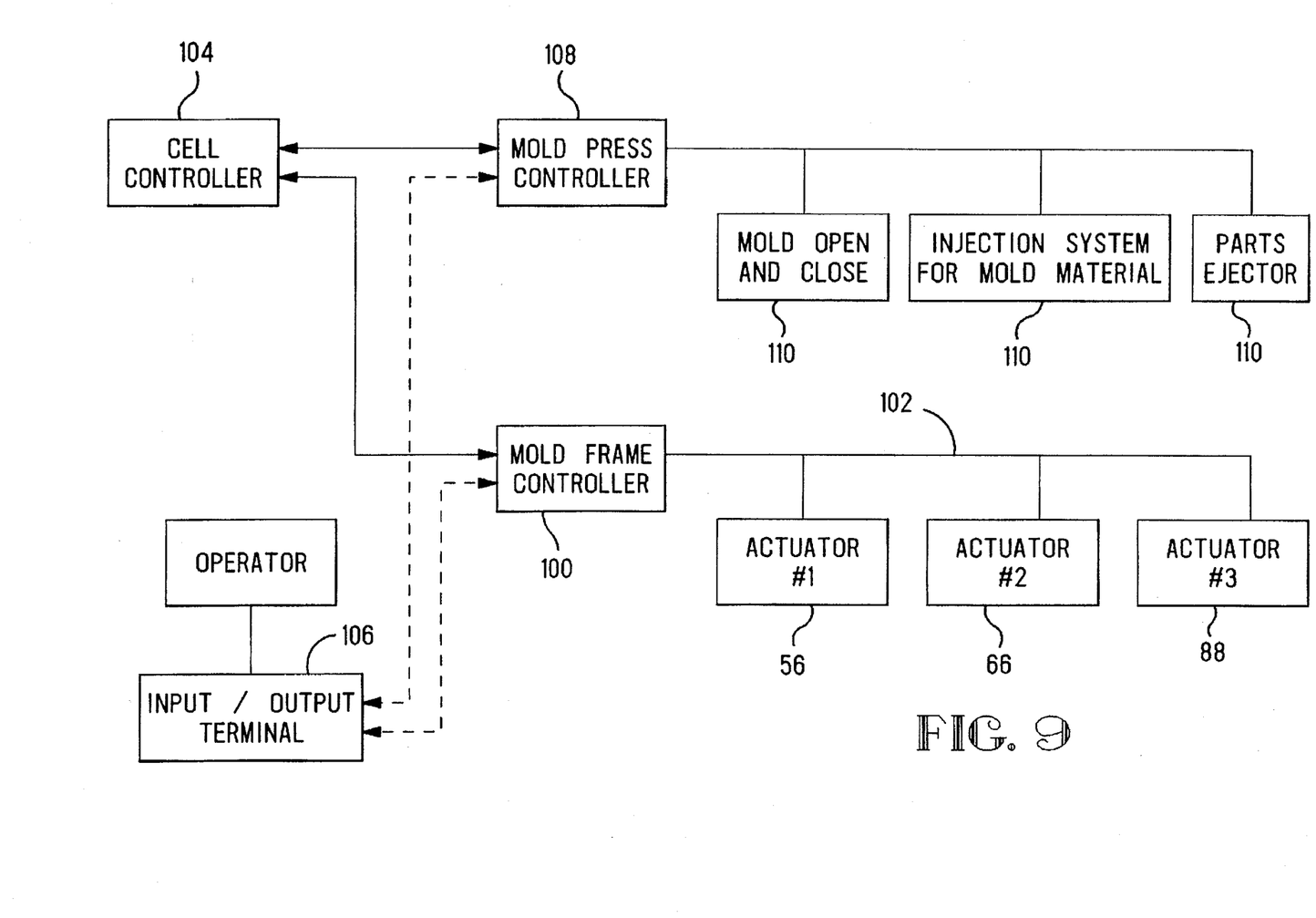
FIG. 9 is a block diagram showing the control functions of the machine shown in FIG. 1.

FIG. 9 is a block diagram illustrating the operating functions described above. There, the cell controller 104 and input/output terminal 106 are shown interconnected, in parallel, to the mold press controller 108 and the mold frame controller 100. The mold frame controller is interconnected with and controls the operation of the three liner actuators 56, 66, and 88 via the control lines 102, while the mold press controller 108 is interconnected with and controls the operation of the standard press functions 110. Apparatus for effecting the standard press functions 110 is well known in the industry and, therefore, will not be shown or described here.

Figure 2:
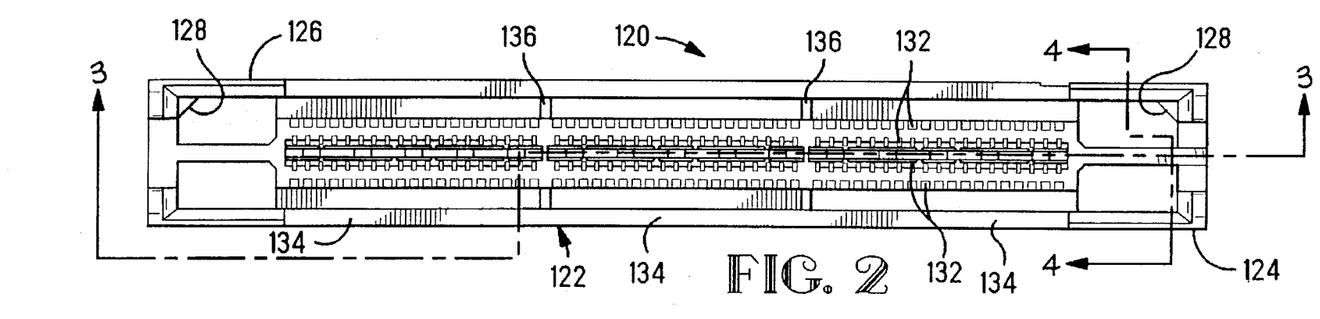
FIGS. 2 and 3 are plan and front views of a typical electrical connector housing that is molded in the machine illustrated in FIG. 1.
Figures 3, 4:
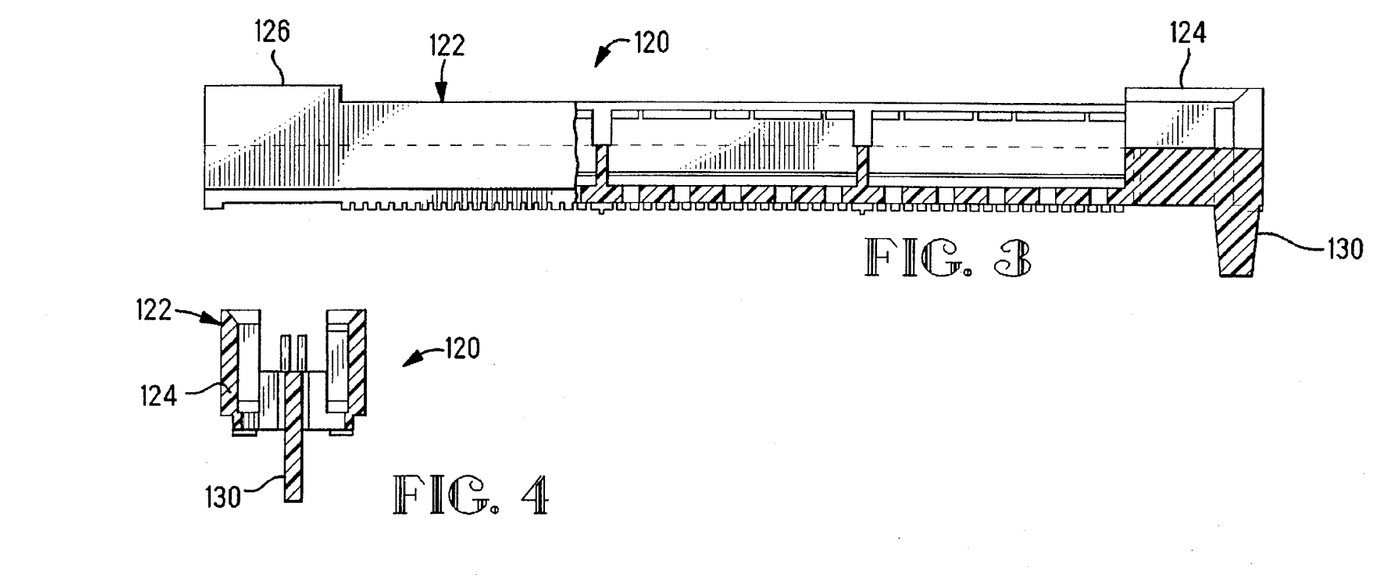
FIG. 4 is a cross-sectional view taken along the lines 4—4 in FIG. 2.

While the present invention can be advantageously utilized in making substantially any part that can be molded, the following description will use an electrical connector housing as a typical example and will explain the unique advantages of molding certain connector housings in the present machine 10. An example of the many different connector housings that can be molded in the machine 10 is shown in FIGS. 2, 3, and 4. There, a connector housing 120 is shown having a main body 122 and right and left ends 124 and 126. The ends 124 and 126 include keying features 128 for assuring proper matching with mating connectors and board lock features 130 for holding the connector housing 120 onto a circuit board, not shown. The main body 122 includes several openings 132 for receiving electrical contacts during a subsequent assembly operation. In the present example, the main body 122 is divided into three modules 134 separated by walls 136, each module having openings 132 for accommodating two parallel rows of 19 electrical contacts each. Such connector housings 120 are typically produced in a variety of different sizes, thereby forming a family of somewhat similar connectors. Each different size includes the same right and left ends 124 and 126, but the main body 122 has a different number of modules 134, depending on the number of contacts desired. Connector housings 120 having three, four, five, and six modules 134 will be discussed below, with respect to the present mold machine 10. However, it will be understood that the machine 10 is not limited to making families of different connector housings nor is it limited to making only connector housings, but with suitable mold cavities can be utilized to make other molded parts as well.

FIG. 5, 6, 7, and 8 are cross-sectional views of the first, second, and third mold bodies 14, 16, and 18, respectively. The first mold cavity 24 of the first mold body 14 includes a form 126' for molding one left end 126 of the connector housing 120 and three forms 134' for molding three modules 134. The second mold cavity 44 of the mold body 16 includes a form 124' in the leg 40 for molding the right end 124, and the third mold cavity 46 in the leg 42 includes one form 124' and one form 134' for molding one right end 124 and one module 134, respectively. The fourth mold cavity 80 of the third mold body 18 includes two forms 134' for molding two modules 134.

Figure 5:
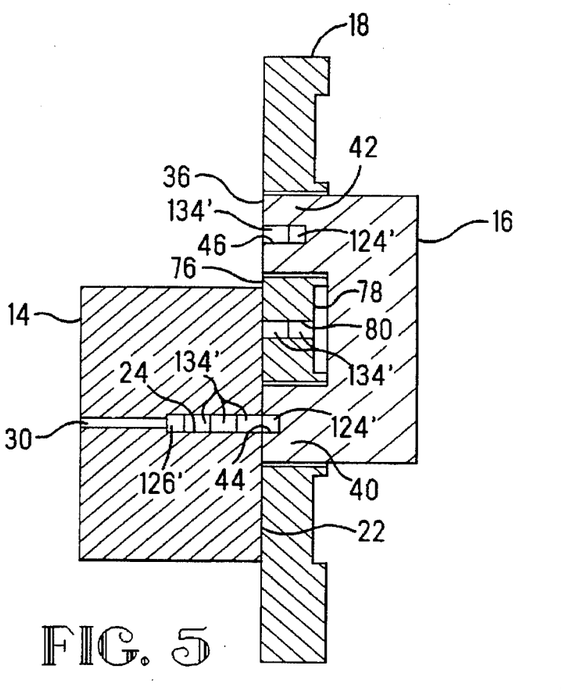
FIGS. 5, 6, 7, and 8 are cross-sectional views of the three mold bodies of the machine illustrated in FIG. 1 showing the various mold configurations.

In operation, the three mold bodies 14, 16, and 18 are arranged in a first position, as shown in FIG. 5, to produce a first connector housing having three modules 134. The actuator 66 is retracted to move the second mold body 16 to the position shown in FIG. 1, the actuator 88 is then extended to move the third mold body 18 to the position shown in solid lines in FIG. 1, the actuator 56 is then extended to move the second mold body 16 to the position shown in solid lines in FIG. 1, and then the actuator 66 is extended so that the second mold body moves toward the first surface and the ends 40 and 42 enter into the openings 96 and 98, respectively, until the second surface 36 of the leg 40 sealingly engages the first surface 22, as shown in FIG. 5. This aligns the two mold cavities 24 and 44. The mold press controller 108 then commands the injector to inject mold material into the first cavity 24 and thereby into the second cavity 44 to make a three module connector housing. The mold press controller 108 then commands the opening of the mold and ejection of the molded part, the closing of the mold, and the injection of mold material to make another part. This process continues until a different part is needed, say for example, a five module connector housing.

Figure 6:
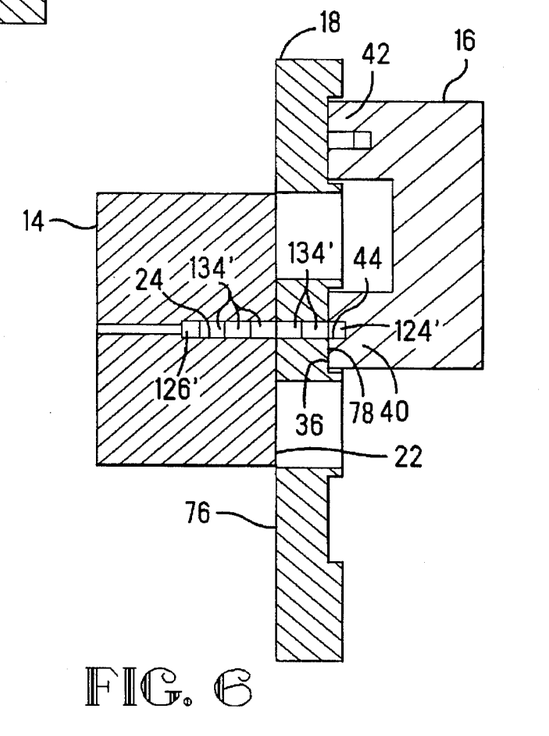

The three mold bodies 14, 16, and 18 are arranged in a second position, as illustrated in FIG. 6. The actuator 66 is retracted to move the second mold body 16 to the position shown in FIG. 1, the actuator 88 is then partially retracted to move the third mold body 18 to the intermediate position shown in phantom lines at 92 in FIG. 1, the actuator 56 remains extended in the position shown in solid lines in FIG. 1, and then the actuator 66 is extended moving the second mold body 16 toward the first surface 22 until the second surface 36 of the leg 40 sealingly engages the fourth surface 78 and thereby urges the third surface 76 into sealing engagement with the first surface 22, as shown in FIG. 6. This aligns the three mold cavities 24, 80, and 44. The mold press controller 108 then commands the injector to inject mold material into the first cavity 24 and thereby into the fourth and second cavities 80 and 44, respectively, to make a five module connector housing. The mold press controller 108 then commands the opening of the mold and ejection of the molded part, the closing of the mold, and the injection of mold material to make another part.

Figure 7:
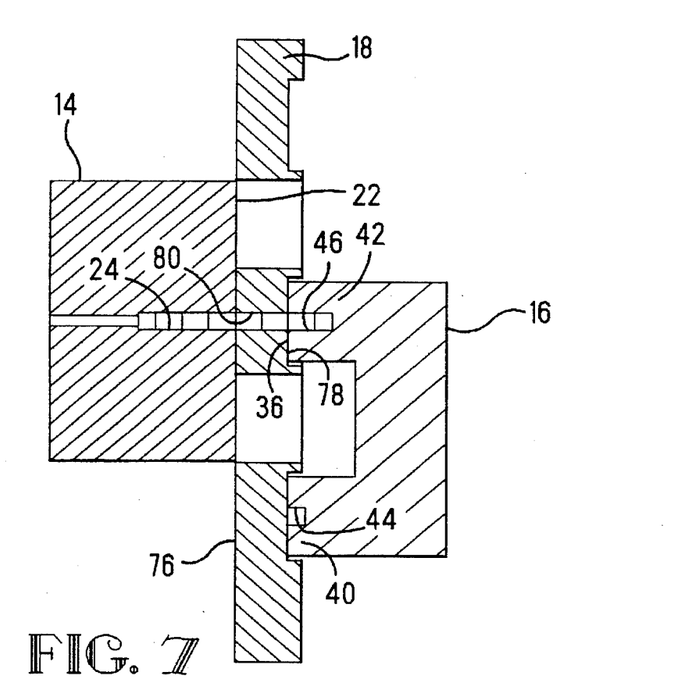

When a six module connector housing is desired, the three mold bodies 14, 16, and 18 are arranged in a third position, as shown in FIG. 7. The actuator 66 is retracted to move the second mold body 16 to the position shown in FIG. 1, the third mold body 18 remains in the intermediate position shown in phantom lines at 92 in FIG. 1, the actuator 56 is retracted to move the second mold body 16 to the position shown in phantom lines at 70 in FIG. 1, and then the actuator 66 is extended until the second surfaces 36 of the leg 42 sealingly engages the fourth surface 78 and thereby urges the third surface 76 into sealing engagement with the first surface 22, as shown in FIG. 7. This aligns the mold cavities 24, 80, and 46. The mold press controller 108 then commands the injector to inject mold material into the first cavity 24 and thereby into the fourth and third cavities 80 and 46, respectively, to make a six module connector housing. The mold press controller 108 then commands the opening of the mold and ejection of the molded part, the closing of the mold, and the injection of mold material to make another part.

Figure 8:
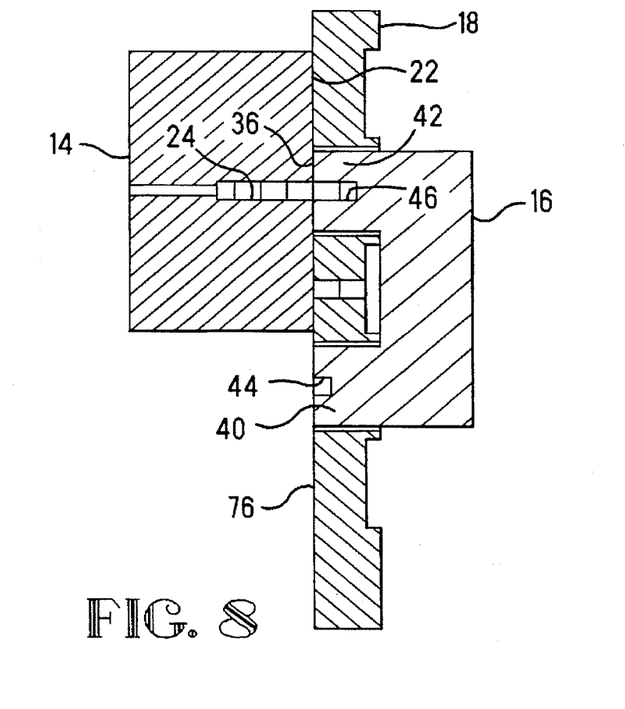

When a four module connector housing is desired, the three mold bodies 14, 16, and 18 are arranged in a fourth position, as shown in FIG. 8. The actuator 66 is retracted to move the second mold body 16 to the position shown in FIG. 1, the actuator 88 is then fully retracted to move the third mold body 18 to the position shown in phantom lines at 94 in FIG. 1, the actuator 56 remains retracted so that the second mold body 16 is in the position shown in phantom lines at 70 in FIG. 1, and then the actuator 66 is extended so that the second mold body 16 moves toward the first surface 22 and the ends 40 and 42 enter into the openings 96 and 98, respectively, until the second surface 36 of the leg 40 sealingly engages the first surface 22, as shown in FIG. 8. This aligns the two mold cavities 24 and 46. The mold press controller 108 then commands the injector to inject mold material into the first cavity 24 and thereby into the third cavity 46 to make a four module connector housing. The mold press controller 108 then commands the opening of the mold and ejection of the molded part, the closing of the mold, and the injection of mold material to make another part.

This process of making molded parts may continue as long as is desired to make any number of parts of each different configuration and in any order. Since the three mold bodies 14, 16, and 18 are automatically moved to their correct respective positions for molding each different part, this movement requiring only about two to three seconds, there is very little lost production time. It will be appreciated by those skilled in the art that the teachings of the present invention can be advantageously utilized with a mold machine having only a first mold body and a second movable mold body, or a mold machine having more than three mold bodies that are moveable to form different combinations of mold cavities to mold different parts. Further, the different parts being molded need not belong to a family, but may be completely independent and unrelated parts.

An important advantage of the present invention is that relatively small quantities of different parts may be molded without shutdown of the mold machine. The mold bodies are automatically reconfigured without the need for an operator. The reconfiguration is accomplished in such a short time that purging of the old mold material and discarding of the first several molded parts is unnecessary. The cost for manufacturing the reconfigurable mold for a typical family of electrical connector housings is substantially less than the cost for manufacturing multiple conventional molds therefor.

I claim:

1. In a method of selectively molding one of a plurality of different parts in a reconfigurable mold apparatus, said apparatus having: (a) a first mold body having a first surface and a first mold cavity therein intersecting said first surface; (b) a second mold body having a second surface arranged for engagement with said first surface and second and third mold cavities therein intersecting said second surface, one of said first and second mold bodies being movable with respect to the other so that one of said second and third mold cavities is in communication with said first mold cavity wherein the second mold cavity has a different configuration than the first mold cavity; (c) an actuator for effecting said movement of said one mold body; and (d) injection means associated with said molding apparatus for injecting molding material into said first mold cavity, said method comprising the steps:

(a) selecting one of said second and third mold cavities to be moved into communication with said first mold cavity;

(b) automatically operating said actuator to move said selected mold cavity into communicating engagement with said first mold cavity; and (c) automatically operating said injection means to inject molding material into both said first cavity and said selected cavity.

2. In a method of selectively molding one of a plurality of different parts in a reconfigurable mold apparatus, said apparatus having: (a) a first mold body having a first surface and a first mold cavity therein intersecting said first surface; (b) a second mold body having a second surface and a second mold cavity therein intersecting said second surface; (c) a third mold body having third and fourth opposite surfaces, said third surface arranged to engage said first surface and said fourth surface arranged to engage said second surface, and having a fourth mold cavity therein intersecting both said third and fourth surfaces, each of said second and third mold bodies being selectively movable with respect to the other and with respect to said first mold body to a first position for molding a first part wherein only said second mold cavity is in communication with said first mold cavity, and to a second position for molding a second part wherein only said second and fourth mold cavities are in communication with said first mold cavity; (d) an actuator for automatically effecting said movement of said second and third mold bodies; and (e) injection means associated with said molding apparatus for automatically injecting molding material into said first mold cavity, said method comprising the steps:

(a) selecting one of said second and fourth mold cavities to be moved into communication with said first mold cavity;

(b) automatically operating said actuator to move said selected mold cavity into communicating engagement with said first mold cavity;

(c) only when said selected mold cavity is said fourth mold cavity then automatically operating said actuator to move said second mold cavity into communication with said fourth mold cavity; and (d) automatically operating said injection means to inject molding material into both said first cavity and said selected cavity.

3. The method according to claim 2 in step (b), when said selected mold cavity is said second mold cavity then automatically operating said actuator to move said second surface toward and into sealing engagement with said first surface, and in step (c) said moving includes moving said second surface into sealed engagement with said fourth surface.

4. The method according to claim 3 wherein said second mold body includes a third mold cavity therein spaced from said second mold cavity and intersecting said second surface, each of said second and third mold bodies being selectively movable with respect to the other and with respect to said first mold body to a third position for molding a third part wherein said third and fourth mold cavities are in communication with said first mold cavity, said selecting of step (a) includes selecting one of said second, third, and fourth mold cavities to be moved into communication with said first mold cavity.

5. The method according to claim 4 wherein step (c) includes: only when said selected mold cavity is said fourth mold cavity then operating said actuator to move one of said second and third mold cavities into communication with said fourth mold cavity.

6. The method according to claim 5 wherein said moving in step (c) includes moving said second surface toward said first surface so that said third and fourth surfaces of said third mold body are straddled by said first and second surfaces of said first and second mold bodies, respectively, and said second and fourth surfaces and said third and first surfaces are in respective mutual sealing engagement.

7. Apparatus for selectively molding one of a plurality of different parts, comprising:

(a) a first mold body having a first surface and a first mold cavity therein intersecting said first surface;

(b) a second mold body having a second surface arranged for engagement with said first surface and second and third mold cavities therein intersecting said second surface, wherein the second mold cavity has a different configuration than the first mold cavity, one of said first and second mold bodies being selectably movable with respect to the other so that one of said second and third mold cavities is in communication with said first mold cavity;

(c) an actuator for effecting said movement of said one mold body, said actuator being automatically controlled by a mold frame controller; and (d) injection means associated with said molding apparatus for injecting molding material into said first mold cavity.

8. The molding apparatus according to claim 7 wherein said first and second surfaces are arranged to sealingly engage and wherein said actuator is arranged to effect said sealing engagement by moving one of said first and second surfaces toward the other.

9. The molding apparatus according to claim 8 wherein said different parts are electrical connector housings, each having a left end, a right end, and at least one module therebetween arranged to receive a plurality of electrical contacts therein, and wherein said first mold cavity is arranged to mold one of said left and right ends and each of said second and third mold cavities are arranged to mold the other of said left and right ends.

10. The molding apparatus according to claim 9 wherein said first mold cavity is arranged to mold three of said connector housing modules and said third mold cavity is arranged to mold one of said connector housing modules.

11. Apparatus for selectively molding one of a plurality of different parts, comprising:

(a) a first mold body having a first surface and a first mold cavity therein intersecting said first surface;

(b) a second mold body having a second surface and a second mold cavity therein intersecting said second surface;

(c) a third mold body having third and fourth opposite surfaces, said third surface arranged to engage said first surface and said fourth surface arranged to engage second surface, and having a fourth mold cavity therein intersecting both said third and fourth surfaces, some of said first, second, and third mold bodies being selectively movable with respect to the others to a first position for molding a first part wherein only said second mold cavity is in communication with said first mold cavity, and to a second position for molding a second part wherein said second and fourth mold cavities are in communication with said first mold cavity;

(d) an actuator for effecting said movement of said second and third mold bodies; and (e) injection means associated with said molding apparatus for injecting molding material into said first mold cavity.

12. The molding apparatus according to claim 11 wherein said second mold body includes a third mold cavity therein spaced from said second mold cavity and intersecting said second surface, said some of said first, second, and third mold bodies being selectively movable with respect to the others to a third position for molding a third part wherein said third and fourth mold cavities are in communication with said first mold cavity.

13. The molding apparatus according to claim 12 wherein said some of said first, second, and third mold bodies being selectively movable with respect to the others to a fourth position for molding a fourth part wherein only said third mold cavity is in communication with said first mold cavity.

14. The molding apparatus according to claim 13 wherein said actuator is arranged to effect said movement of said second and third mold bodies in a direction parallel to said first surface and to effect said movement of said second mold body in a direction toward and away from said first surface.

15. The molding apparatus according to claim 14, wherein when said first, second, and third mold bodies are in one of said second and third positions, said third surface is in sealed engagement with said first surface and said fourth surface is in sealed engagement with said second surface.

16. The molding apparatus according to claim 14 wherein when said first, second, and third mold bodies are in one of said first and fourth positions, a portion of said second surface is in sealed engagement with said first surface.

17. The molding apparatus according to claim 14 wherein said third mold body includes an opening extending there-through and intersecting said third and fourth surfaces, and wherein a portion of said second mold body extends into said opening when said first, second, and third bodies are in said first and fourth positions.

18. The molding apparatus according to claim 17 wherein said first, second, and third parts are electrical connector housings, each having a left end, a right end, and at least one module therebetween arranged to receive a plurality of electrical contacts therein, and wherein said first mold cavity is arranged to mold one of said left and right ends and said second mold cavity is arranged to mold the other of said left and right ends.

19. The molding apparatus according to claim 18 wherein said first mold cavity is arranged to mold three said connector housing modules, said fourth mold cavity is arranged to mold two said connector housing modules, and said third mold cavity is arranged to mold one said connector housing module and one of said left and right ends, so that said first part includes left and right ends and three connector housing modules therebetween, said second part includes left and right ends and five connector housing modules therebetween, and said third part includes left and right ends and six connector housing modules therebetween.

20. The mold apparatus according to claim 19 including a mold frame controller associated with said machine 10, wherein said actuator is automatically operated by said mold frame controller.

* * * * *